United States Patent

[11] 3,564,131

[72] Inventors Edward W. Herold
Kenneth H. Fischbeck, Princeton, N.J.
[21] Appl. No. 692,944
[22] Filed Dec. 22, 1967
[45] Patented Feb. 16, 1971
[73] Assignee RCA Corporation
[32] Priority Feb. 20, 1967
[33] Great Britain
[31] 8007/67

[54] SPATIALLY MODULATED HALFTONE DOT IMAGE GENERATION SYSTEM
3 Claims, 8 Drawing Figs.

[52] U.S. Cl. .......... 178/6.7, 101/395, 178/6.6
[51] Int. Cl. .......... H04n 5/84
[50] Field of Search .......... 178/6.7, 6.7 (A), 6.6 (B), 7.7; 179/100.3 (A)

[56] References Cited

UNITED STATES PATENTS 3,517,119 6/1970 Klensch .......... 178/6.7
2,060,778 11/1936 Finch .......... 178/6.6X
2,136,340 11/1938 Hardy .......... 178/6.7X
2,892,887 6/1959 Hell .......... 178/6.6
3,197,558 7/1965 Ernst .......... 178/6.6
3,461,229 8/1969 Oppenheimer .......... 178/6.7X

*Primary Examiner*—Bernard Konick
*Assistant Examiner*—Raymond F. Cardillo, Jr.
*Attorneys*—H. Christoffersen

ABSTRACT: A halftone image generation system produces a replica of an original continuous tone pattern by utilizing halftone dots of substantially the same size. The continuous tones in the original pattern are duplicated in the halftone image thereof by varying the spacing between the halftone dots. The spaces between the halftone dots are, for example, small when a dense tone is duplicated, whereas the spacing is made larger when a less dense tone is duplicated.

The halftone dot generator in the system may, for example, comprise an electronic imaging device that generates the halftone dots in the form of light radiation for focusing onto photographic film; or an optical device, such as a laser, that forms the halftone dots as indentations or cavities on a printing plate, or similar devices.

INVENTORS
EDWARD W. HEROLD AND
KENNETH H. FISCHBECK

BY John T. O'Halloran
ATTORNEY

INVENTORS
EDWARD W. HEROLD AND
KENNETH H. FISCHBECK
BY John T. O'Halloran
ATTORNEY

SPATIALLY MODULATED HALFTONE DOT IMAGE GENERATION SYSTEM

BACKGROUND OF THE INVENTION

The printing process commonly used in the Graphic Arts Industry, i.e. newspaper publishing, book publishing, etc. deposits a uniform density of ink on paper whenever it is desired to print all or a portion of a pattern and deposits no ink when the absence of a pattern is desired. This all-or-nothing process poses no problems when patterns such as alphabetic and other symbols and marks are to be printed. However, when patterns such as photographic scenes are to be printed, the problem of reproducing continuous tones ( i.e. light gradations) arises. This problem has been solved by transforming the continuous tones in the original pictorial scene into a halftone image that is composed of a large number of inked dots of various sizes. This is termed "screening" and is accomplished by projecting the pictorial scene through a fine mesh screen onto photographic film. When the largest dots and the white paper between the dots are made small compared with the visual acuity of the human eye, i.e. the dots and spaces are subliminal to the eye, the dots and the spaces between the dots fuse visually in the screened image and trick the eye into believing it is seeing continuous tones.

Such prior art technique poses problems when various printing techniques, e.g. gravure (intaglio) printing, are utilized. This is because the ink carried in the intaglio cavities is not transferred linearly to the printing paper. That is, one halftone dot cavity of twice the size of a second halftone dot cavity does not transfer twice the ink to the paper. Similar nonlinear effects occur in letterpress and offset printing. Consequently, halftone images made by such prior art techniques do not accurately portray the continuous tones in the original pattern.

SUMMARY OF THE INVENTION

A system for producing a halftone image of continuous tone pattern includes means for generating halftone dots with each of the dots being substantially of the same size, and means for varying the spacing between the dots so that the number of halftone dots per unit area, rather than their sizes, portrays the continuous tones in the original pattern.

BRIEF DESCRIPTION OF THE DRAWINGS

FIG. 2 comprises

DETAILED DESCRIPTION OF THE DRAWINGS

Figure 1:
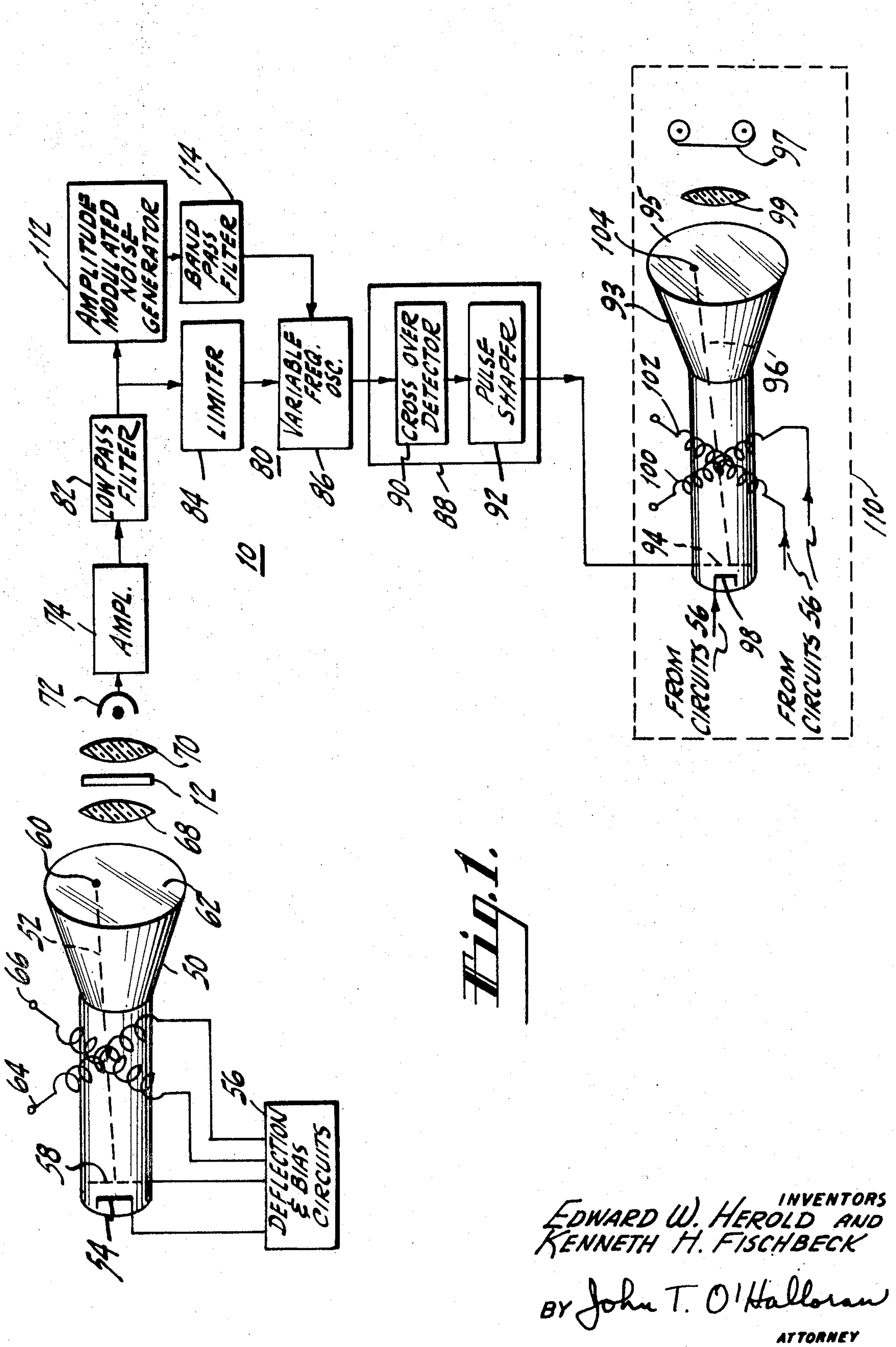
FIG. 1 is a schematic circuit diagram of a halftone image generation system embodying the invention.

Referring now to FIG. 1, a halftone image generation system 10 converts a continuous tone pattern on a transparency 12 into halftone dots on the face of an imaging device 93 by electronically screening the transparency 12. The imaging device may, for example, comprise a cathode ray tube, and is shown as such, although solid state display devices may also be utilized. The electronically screened halftone dots produced on the face 95 of the cathode ray tube are focused onto a photographic film 97 by means of a lens system that is shown in FIG. 1 as a single convex lens 99, to produce the halftone image thereon. The photographic film 97, which may comprise high gamma film, is then processed to form a printing plate.

Figures 2A, 2B, 2C, 2D:
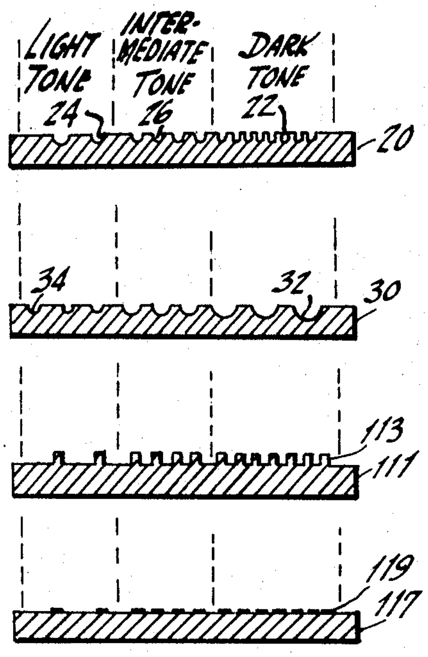
FIGS. 2*a*, 2*b*, 2*c*, and 2*d*, are cross-sectional representations of printing plates for printing halftone images.

The printing plate derived from the photographic film 97 may, for example, comprise an intaglio printing plate 20 as shown in cross section in FIG. 2*a*. It is to be noted from the printing plate 20 that all of the indentations or cavities in the plate are of the same size, i.e. same volume and same depth. The difference between a light tone and a dark tone is a function of the spatial density of the cavities, i.e. the number of cavities in a unit area or unit length. Thus the plate 20 exhibits variable spatial densities for variable tones. For a dark or dense tone, there is a large number of cavities 22 in a given area whereas for a light tone there are relatively few cavities 24. For an intermediate tone there is an intermediate number of cavities 26.

The printing plate 20 is to be contrasted with the printing plate 30 in FIG. 2*b*. The printing plate 30 illustrates a prior art technique of providing a constant spatial density of cavities, i.e. the same number of cavities per unit area or unit length. The different tones are duplicated by making the cavities 32 larger, i.e. greater in volume, for dark tones, and making the cavities 34 smaller for lighter tones.

Figure 3:
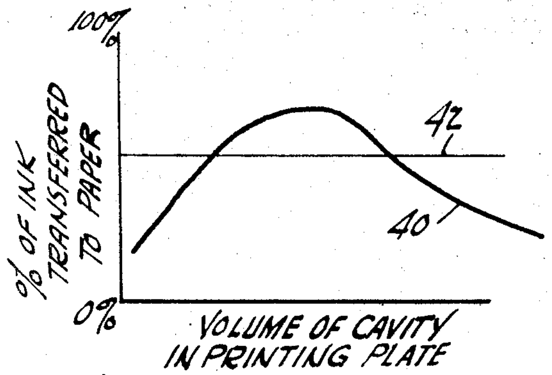
FIG. 3 is a graphic illustration of the transfer of printing ink to paper from the plate of FIG. 2*b*.

Even though the cavities in the plate 30 may effectively denote the proper tones by their sizes, the ink utilized to reproduce the tones on paper creates a problem. This is because the ink deposited by the different size cavities is not directly proportional to the sizes of the cavities. Thus the printing plate 30 does not accurately reproduce the tones of the original pattern. This may be seen by referring to the curve 40 in FIG. 3. The curve 40 represents the percentage of ink in a cavity that is transferred to the printing paper for the various sizes of cavities. It is to be noted that for small and large cavities the percent of ink transferred differs considerably from that transferred by an intermediate size cavity. The ideal curve is of course the straight line 42 in FIG. 3. Such a line 42 denotes that the percentage amount of ink transferred from the various cavities is the same regardless of their sizes. Hence the amounts of ink reflect exactly the sizes of the cavities.

Figure 4:
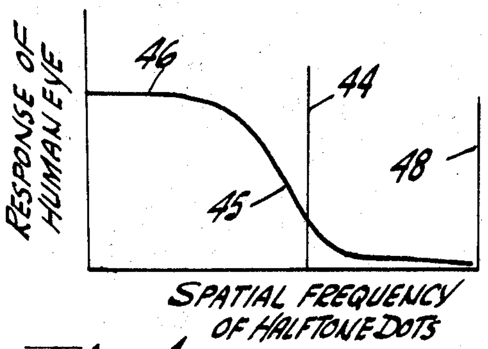
FIG. 4 is a graphic illustration of the response of the human eye to halftone dots of greater and lesser density.

It is to be noted that there is a radio communications analogy to the spatial density of the cavities or halftone dots in the printing plates 20 and 30. The spatial density or frequency of the halftone cavities in the printing plate 30 is a constant as shown by the curve 44 in FIG. 4. The curve 46 in FIG. 4 illustrates the visual acuity or response of the human eye to the different spatial frequencies of the halftone dots. Where the frequency is low, the eye can detect individual dots whereas when the frequency is high, the halftone dots effectively are averaged and simulate the tones in the original pattern. The "knee" or threshold 45 of the curve is the limen of the response of the human eye and the spatial densities above this limen are subliminal to the eye. In radio frequency communications, the transmission of intelligence by the amplitude modulation of a carrier is analogous to the variable sized, constant density cavities of the printing plate 30. It is to be recalled that in amplitude modulation (AM), the frequency of the radio frequency carrier signal is a constant but the amplitude of the signal is varied to convey the intelligence to be transmitted. The constant sized, variable density cavities of the printing plate 20, (FIG. 2*a*) is analogous to the radio frequency transmission of intelligence by the frequency modulation of a carrier signal. In frequency modulation (FM), the amplitude of the carrier signal is a constant but the frequency of this signal is varied to convey the intelligence. The system 10 in FIG. 1 is effectively an FM halftone system. The spatial frequencies of the halftone dots produced by the system 10 are chosen to vary between the constant frequency lines 44 and 48 in FIG. 4. These frequencies are all beyond the limen 45 of the response curve 46.

FM radio transmission exhibits the advantage over AM transmission of providing relatively noise free signals. Similarly, FM screening ( i.e. constant size but variable density halftone dots) also exhibits advantages over AM screening ( i.e. constant density but variable sized halftone dots). This is because in AM screening moire patterns tend to occur when the original pattern contains material i.e. "picket fence" material exhibiting a spatial frequency close to the constant screening frequency denoted by the line 44 in FIG. 4. This effect is analogous to interference beats in radio frequency communications. However, in FM screening the frequency varies over an appreciable range and the effect of beat patterns is reduced appreciably.

Referring back to FIG. 1, the electronically screened halftone image of the transparency 12 is obtained by first scanning the transparency by means of a scanner 50. The scanner 50 may, for example, comprise any one of a variety of scanning devices. However, for the purposes of this disclosure, it will be assumed that the scanner 50 comprises a flying spot scanner. The scanner 50 has an electron scanning beam 52 that emanates from a cathode 54 in the tube 50. The deflection of the scanning beam 52 is under the control of deflection and bias circuits 56. The scanning beam 52 may be blanked or unblanked under the control of a control grid 58 and the unblanking of the scanning beam 52 produces a spot of light 60 on the face 62 of the scanner 50. The scanning beam 52 and hence the light spot 60 is assumed to be deflected in a television raster scanning pattern having a relatively fast left-to-right horizontal scan with a relatively slow top-to-bottom vertical scan, with quick retracing of the scanning beam 52 at the end of each scan. It is of course apparent that jump or typewriter scanning patterns may also be utilized. The scanning beam 52 is deflected horizontally by a horizontal deflection coil 64 and vertically by a vertical deflection coil 66. Electrostatic deflection may also be used to deflect the beam 52.

The scanning beam 52 is focused onto the transparency 12 by means of a focusing lens 68. The light penetrating through the transparency depends on the density ( i.e. darkness or lightness) of the tones in the original pattern on the transparency 12. The light penetrating through the transparency 12 is focused by means of a second focusing lens 70 onto a light sensor 72. The light sensor 72 may be a photomultiplier or photodiode tube. The light signal transmitted through the transparency 12 is transduced into a varying DC electronic image signal by the phototube 72. The phototube 72 generates a relatively high amplitude electronic image signal when the tone scanned in the transparency 12 has a low density ( i.e. light) and a relative low amplitude electronic image signal when the tone scanned has a high density ( i.e. dark). Consequently, the electronic image signal simulates in amplitude the continuous tones present in the transparency 12. It is of course apparent that the pattern to be screened may be an opaque photograph. In such a case, the light reflected from the photograph is utilized to obtain the electronic image signals. The electronic image signals derived from the phototube 72 are amplified in an amplifier 74 and applied to a halftone dot generator 80.

The halftone dot generator 80 includes a low pass filter 82 that filters out or eliminates original pattern components that are high in frequency. The elimination of such high frequency components reduces the possibility of moire patterns developing in the system 10. A limiter 84 is coupled to the output of the low pass filter 82 to limit the amplitude of the electronic image signals and thereby provide a predetermined reference level of brightness. A variable frequency oscillator 86 is coupled to the limiter 84 to respond to the varying amplitudes of the electronic image signals by producing oscillatory signals having frequencies that are directly proportional to the amplitudes of the electronic image signals. A pulse generator 88 is coupled to the variable frequency oscillator 86 to produce constant amplitude pulses of the same width or duration. The pulse generator 88 may, for example, comprise a crossover detector 90 and a pulse shaper 92 so that each crossover or zero amplitude point in the oscillatory signal produces a pulse that is then shaped into a uniform width and height. The frequency of the pulse output of the pulse generator 88 depends upon the frequency of the oscillatory signal derived from the variable frequency oscillator 86.

The pulse output from the pulse generator 88 is coupled to the control electrode 94 of the imaging device 93. The imaging device 93 includes an electron scanning beam 96 that emanates from the cathode 98. The electron scanning beam 96 is blanked and unblanked by the pulses applied to the control electrode 94 from the pulse generator 88. The electron scanning beam 96 is deflected by horizontal and vertical deflection coils 100 and 102 that are coupled, along with the cathode 98, to the deflection and bias circuits 56 so that the energization and scanning of the scanner 50 is synchronized with the energization and scanning of the imaging device 93.

The blanking and unblanking of the scanning beam 96 produces light spots or halftone dots 104 on the face of the device 93 due to the electron stimulation of the phosphor on the face 95. The light spots are shaped by the pulses from the generator 88 and may be round, square, or oblong, as desired. The lens 99 is positioned intermediate the face 95 of the imaging device 93 and a recording surface 97 onto which the halftone dots are projected. The surface 97 may be high gamma photographic film on which the light emanating from the dots 104 on the face of the imaging device 93 is focused. Consequently, the light images created on the face of the device 93 are recorded on the surface 97. A plurality of halftone dots or halftone representations are recorded on the surface 97 and these halftone representations are of a constant subliminal area having a reflectance to light that differs from the surrounding areas of the surface 97. The spacing between the halftone subliminal areas in any portion of the recording surface 97 has an average value that is approximately inversely proportional to a desired change in reflectance. A light-tight compartment 110, shown dashed in FIG. 1, encloses the light sensitive portions of the halftone generator 80. The light-tight compartment may, for example, have doors (not shown) which permit access into the compartment.

There is also shown in FIG. 1, a noise generator 112 which is connected in the system. The noise generator 112 introduces a random variation in spacing that is superimposed on the average spacing between subliminal areas in a region. The regional spacing represents a tone. The random variation is however proportional to the average because the noise signals generated in the generator 112 are amplitude modulated by coupling the electronic image signals from the low pass filter 82 to the generator 112. This as stated previously is done to make the noise signals proportional to the tones in the transparency 12. The amplitude modulated noise generator 112 produces high amplitude random noise signals for low level electronic image signals and low amplitude random noise signals for high level electronic image signals. Thus for regions of the recording surface 97 having a small number of halftone dots, the random noise is large and the dots are spaced nonuniformly apart. Where there are a large number of halftone dots the random noise introduced is small and the dots are more uniformly spaced. The introduction of these noise signals in this manner prevents the creations of moire patterns in the halftone image. The noise signals generated in the generator 112 are coupled through a bandpass filter 114 to the variable frequency oscillator 86. The filter 114 passes frequencies corresponding to those above the screening frequency corresponding to the line 44 in FIG. 4 and those below the frequency corresponding to the line 48 in FIG. 4.

OPERATION

In describing the operation of FIG. 1, it will be assumed that the system 10 is operated online in that the continuous tone transparency 12 is being scanned coincidentally with the production of the halftone image on the recording surface 97. It is also assumed that the transparency 12 is a negative. When light from the scanning spot 60 of the scanner 50 is focused onto the transparency 12 the light or radiant energy penetrating through the transparency 12 causes the phototube 72 to produce lower amplitude electronic image signals when a tone in the original pattern, from which the negative 12 is made, is light and higher amplitude signals when a tone is dark. The phototube 72 functions as a transducer to change the radiated light signals from the transparency 12 into variable DC electronic image signals. The electronic halftone generator 80 electronically screens the electronic image signals and the imaging device 93 transduces the screened electronic image signals into screened and radiated light signals. The screened light signals are focused onto the photographic film 97 to record the halftone image.

In detail, the halftone dot generator 80 amplifies the electronic image signals from the amplifier 74 and the filter 82 filters out the high frequency components above the range of operation of the oscillator 86. The oscillator 86 produces oscillatory signals having frequency corresponding to the amplitude of the electronic image signals. Large amplitude signals generate a high frequency and low amplitude signals produce a low frequency. The oscillatory signals may be sinusoidal or any other periodic signals. The zero crossover points are detected in the detector 90 in the pulse generator 88 to produce pulses that are shaped by the pulse shaper 92 into uniform amplitude and uniform width pulses. Thus the number of pulses in a unit time is directly proportional to the amplitudes of the image signals and hence the tones in the transparency 12. The pulses from the pulse shaper 92 bias the control electrode 94 to unblank the scanning beam 96 in the imaging device 93. In between the pulses, the scanning beam 96 is blanked or turned off. The unblanked scanning beam 96 produces light dots 104 on the face of the device 93. The light dots 104 are of uniform duration and intensity. The light dots 104 are recorded on the photographic film 97, to produce halftone dots thereon. The halftone dots on the film 97 are of uniform size. The number of halftone dots per unit area on the film 97 vary according to the tones in the transparency 12. Since the film 97 and transparency 12 are scanned in unison, the halftone dots on the film 97 are in register with the tones in the transparency 12. The photographic film 97 is then processed into a printing plate such as the gravure plate 20 in FIG. 2*a* wherein the cavities are all of uniform size but vary in spatial density. Offset and letterpress printing plates may also be derived from the film 17. The photographic film 97 may be processed into a letterpress printing plate such as the plate 111 of FIG. 2*c* wherein relief patterns 113 are all of the same size and correspond in number to the cavities in the plate 20 to represent the same tones. The film 97 may also be processed into an offset printing plate 117 as shown in FIG. 2*d*. The plate 117 includes halftone representations 119 that are oleophilic and of the same size. The oleophilic areas 119 correspond in number and position to the cavities in the gravure plate 20 to represent the same tones. It is to be noted that letterpress printing plates that are made similar to the plate 111 in FIG. 2*c* do not exhibit the nonlinear effects that occur in prior art letterpress halftone plates. In such prior art plates the smaller sized relief dots are back etched proportionately more than the larger sized relief dots. Consequently, the halftone relief dots exhibit a nonlinearity when used to ink a paper. A similar effect occurs in offset printing wherein the smaller sized oleophilic dots tend to disappear in the printing.

An advantage of the FM system 10, is that gravure, letterpress, or offset printing plates can be made from the same photographic film 97 without retouching. In prior art AM techniques, each nonlinearity in gravure, letterpress, and offset printing requires different retouching techniques.

It is to be noted that applicant's technique of screening cannot be duplicated nonelectrically because continuously variable physical screens are not practical.

The inclusion of the noise generator 112 and filter 114 into the system 10 not only eliminates any moire patterns introduced by the periodicity occurring in successive scanlines but also produces a mezzotint effect in the halftone image formed on the film 97. Such a special effect is particularly desirable in advertising work.

DETAILED DESCRIPTION OF EMBODIMENT OF FIG. 5

Figure 5:
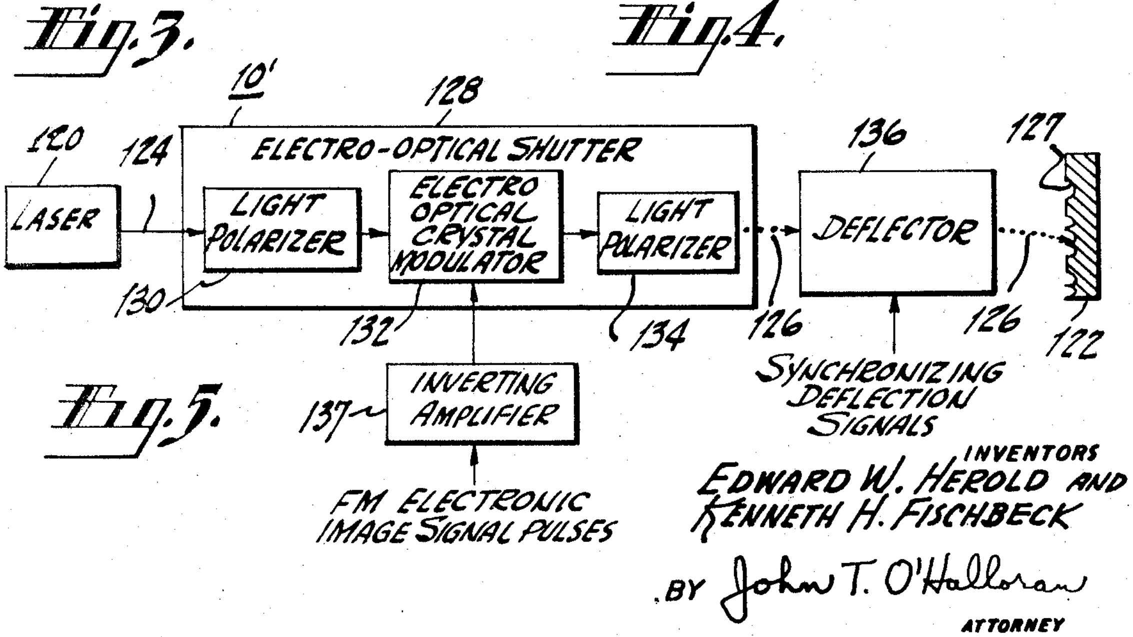
FIG. 5 is a block diagram of another embodiment of the halftone image generation system.

Referring now to FIG. 5, there is shown an embodiment of the electronic FM halftone screening system 10′ wherein a laser 120 is substituted for the imaging device 93. The laser 120 functions effectively as the transducer of the electronic image signals in the system 10′ and converts these signals into radiant energy for forming a halftone image directly on a printing plate 122. Thus the system 10′ eliminates the necessity of first forming a halftone image on photographic film. The laser 120 may, for example, comprise a ruby laser that emits a beam of coherent light 124 that is broken into pulses 126 (shown dotted) and then utilized to produce the halftone image directly on the printing plate 122 such as by forming identical sized cavities 127 on the plate 122. The radiant energy in the pulse beam 126 forms the cavities. The printing plate 122 may also comprise a plastic master plate from which metallic plates are later formed. The laser beam 124 is blanked aperiodically by an electrooptical shutter 128 to produce the pulses 126. The laser 120 may also be Q switched to provide the pulses 126.

The shutter 128 includes a first light polarizer 130 for polarizing the radiant beam 124 in one direction, a crystal modulator 132, and a second light polarizer 134 (sometimes called an analyzer) identical to the first light polarizer 130. The crystal modulator 132 has no effect on the polarized laser light beam derived from the first polarizer 130 until FM control pulses corresponding to the pulses derived from the pulse generator 88 in FIG. 1 but inverted and amplified by the inverting amplifier 137, are applied to the modulator 132. Since the signals derived from the generator 88 are inverted, the FM halftone pulses have no affect on the modulator 132. However, the inverted interpulse spaces now comprise control pulses that rotate the polarized laser beam so that it fails to pass through the second polarizer 134. Consequently, laser beam pulses 126 are produced corresponding to the FM pulses produced by the generator 88.

A deflector and focuser 136 that is synchronized to the original scanning of the transparency 12 is included in the system to focus the laser pulses 126 onto the printing plate 122 as well as to deflect the laser pulses 126 in the same scanning pattern as used to scan the transparency 12. The transparency 12 may, of course, be scanned at a lower rate than the embodiment shown in FIG. 1. It is of course also apparent that the plate 122 need not have cavities 127 formed therein. The plate 122 may also be covered with a photoresist and the laser 120 utilized to harden the photoresist.

Thus in accordance with the invention, there is provided an FM screening system that generates halftone images either on film or directly on a printing plate. The halftone images provide a replica of an original pattern by producing a plurality of halftone dots of the same size, with the number of dots per unit area being directly related to the tones in the original pattern.

One of the advantages derived from this system is that the same amount of ink flows from each halftone dot so that the end result is easily predictable. This is particularly important in three or four ( i.e. black plate also) color printing. Prior art color printing utilizes an AM screening system wherein the sizes of the dots reflect the colors in the original color pattern. Since ink is printed unevenly in such a system, the prior art techniques involve a trial-and-error process where proofs are run, the plates handcorrected, and then proofs rerun and so on. Such trial-and-error techniques are substantially reduced in a system embodying the invention.

We claim:

1. A system to provide an image of a continuous tone pattern comprising in combination:
   means for optically scanning said pattern to produce optical image signals,
   means for transducing said image signals into electronic pulses having pulse repetition rates that are inversely proportional to the desired brightness of said image, and
   means for introducing into said electronic pulses random pulse timing that is directly proportional to the desired brightness of said image.

2. A system to reproduce on a surface having a given spectrally-dependent reflectance patterns of variable light reflectances comprising in combination:

means providing a plurality of similar visually subliminal areas having a spectrally-dependent reflectance that differs from said given reflectance of said surface, means for varying the spacing between said subliminal areas in portions of said surface to provide average spacings in said portions that are substantially inversely proportional to desired changes in said given reflectance of said surface, and means for introducing random variations into said spacings with said random variations being proportional to the average spacings in said portions.

3. A system in accordance with claim 2 wherein said subliminal areas are formed by exposing a photosensitive surface to light created in an imaging device.